United States Patent [19]
Johnson et al.

[11] Patent Number: 6,140,958
[45] Date of Patent: Oct. 31, 2000

[54] REMOTE POSITION SENSING SYSTEM FOR USE WITH AN UNMANNED APPARATUS

[75] Inventors: Mark W. Johnson, Cedar Rapids; Paul G. Jagnow, Iowa City; Daniel C. Forseth, Cedar Rapids, all of Iowa

[73] Assignee: Rockwell Science Center, Inc., Thousand Oaks, Calif.

[21] Appl. No.: 08/866,612

[22] Filed: May 30, 1997

[51] Int. Cl.$^7$ ...................................................... G01S 5/02
[52] U.S. Cl. ..................................... 342/357.09; 701/214
[58] Field of Search .............................. 342/357, 357.09; 701/214

[56] References Cited

U.S. PATENT DOCUMENTS

| | | | |
|---|---|---|---|
| 5,594,454 | 1/1997 | Devereux et al. | 342/357 |
| 5,736,960 | 4/1998 | Murphy et al. | 342/357 |
| 5,786,790 | 7/1998 | Abbott | 342/357 |

Primary Examiner—Mark Hellner
Attorney, Agent, or Firm—Kyle Eppele; James P. O'Shaughnessy

[57] ABSTRACT

A system for monitoring guiding and controlling an unmanned, unteathered flight vehicle, generally assumed to be moving through the earth's atmosphere at a high rate of speed. The system is comprised of on-board positional receiver and processing means coupled to a transceiver capable of combining such positional information with additional data relative to the health and status of the flight vehicle and transmitting the same to a ground station of compatible and simplified design. A preferred positional determination means is to utilize a form for GPS signal thereby affording one the opportunity to include appropriate processing software or additional componentry if necessary for base station purposes and thereby provide a relatively inexpensive system having a low probability of detection for intercept that simultaneously yields vastly improved operating performance characteristics over the mere translation of received GPS signals to down-link or to remote stations as known in the prior art.

20 Claims, 3 Drawing Sheets

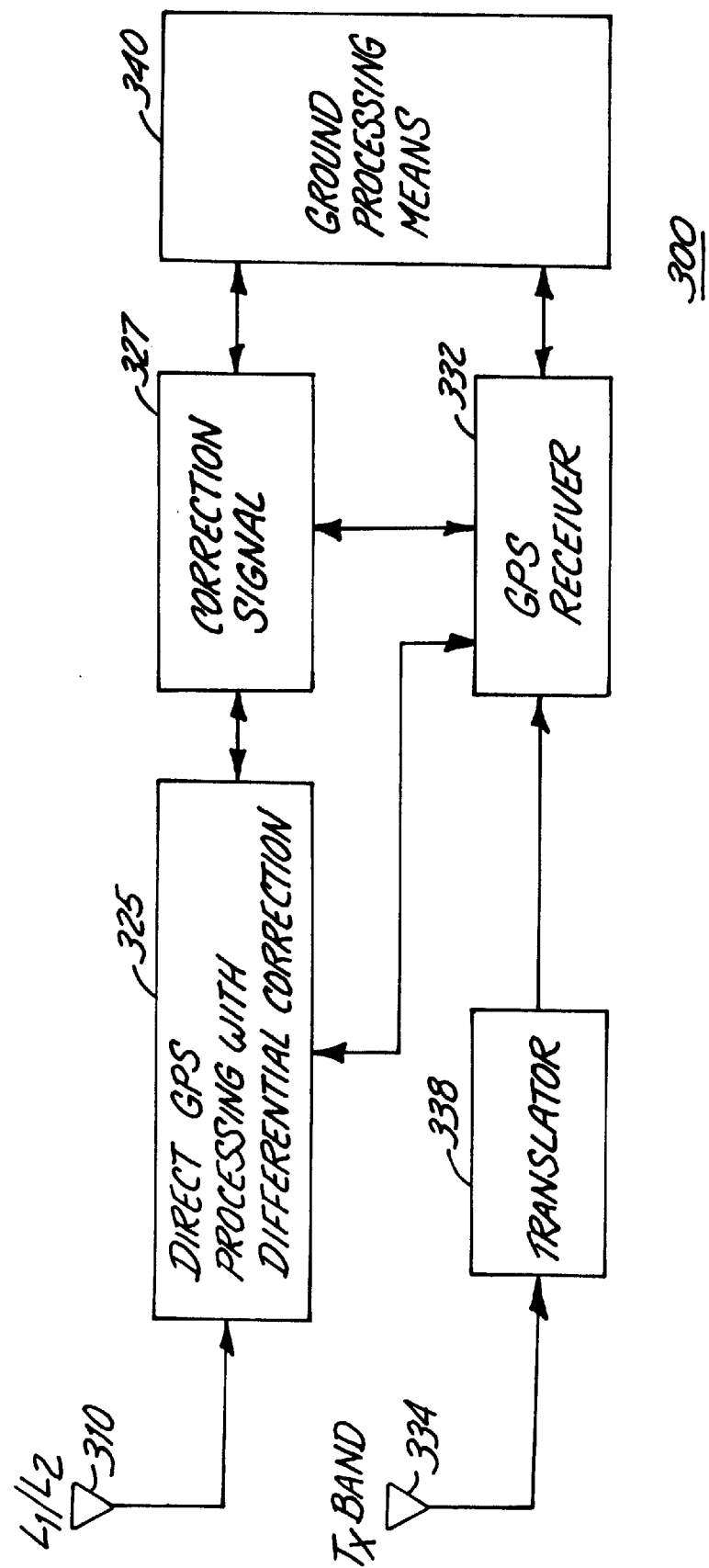

REMOTE POSITION SENSING SYSTEM FOR USE WITH AN UNMANNED APPARATUS

FIELD OF INVENTION

The present invention relates to positioning systems and more particularly to remote positioning systems and methods for determining the position and flight path of an unmanned apparatus relative to the surface of the earth.

BACKGROUND OF THE INVENTION

The term navigation can be broadly defined as the means by which a craft is given guidance to travel from one known location to another. Irrespective of the size, speed or type of craft, or duration of travel, arrival at the desired destination is of paramount importance. Historically, a variety of methods have been invoked in order to accomplish navigation of a moving vehicle. With the advent of satellite position determination systems, such as the NavStar GPS, operated by the U.S. Government, precise position determination within a few meters can be accurately determined and a travel path interpolated by virtue of recording several such data points. Thus, in most instances GPS type systems have become a preferred method of navigating position determination.

The GPS system is comprised of a constellation of earth orbiting spacecraft that continuously transmit dual frequency telemetry that provide timing information relative to the specific spacecraft. A user having a GPS receiver, tunable to either of the two frequencies (L1 or L2) is able to accurately determine his position relative to the earth's surface by virtue of acquiring the signals from four or more spacecraft and determining the range of the receiver from each craft. Well known processing techniques are then utilized in order to provide the user meaningful longitude, latitude and altitude information. One of the two codes utilized, precise code or P-code, has an exceptionally long data sequence modulated at 10.23 MHz. The other telemetry stream is referred to as course/acquisition mode or C/A-code and is a gold code sequence having a chip rate of 1.023 MHz. The gold-code sequence is a well known conventional pseudo-random sequence repeated once every millisecond. Positional accuracy between the two codes varies greatly with the P-code providing the more precise measurement. In order to increase the accuracy of the C/A-code many GPS receivers work in combination with an additional signal emanating from a known location or source, thereby providing accuracy equal to or exceeding P-code. This approach is generally referred to as differential GPS, and is well known in the art.

Initial GPS receivers were quite large and expensive thereby mandating user platforms to relatively large land based or airborne vehicles. As a result of the continued evolution in the electronics industry, the physical size of individual components has shrunk exponentially, while simultaneously exhibiting functional increases of vast proportion. As a direct result of such electronic evolution, the unit price of good quality GPS receivers has continued to decrease such that prices less than five hundred dollars per unit are rather typical. The attainment of relatively low receiver unit pricing affords GPS technology to many applications heretofore considered inappropriate or non-cost beneficial for such applications.

Unmanned vehicles whether self-propelled or projected, represent a new arena of items that could benefit from GPS technology. Whether utilized in a manner to provide control and guidance during the course of flight, or whether the results of a first flight is utilized for adjustments in the trajectory of subsequent items, the inclusion of miniaturized GPS receivers on or in such items provides benefits heretofore not available to such users.

By way of example, large mortar shells directed at medium range targets (30–50 kilometers) determine target distance by virtue of a "registration" shell fired at the target. The registration shell that contains a portion of a GPS receiver and a data translator, which in effect transmits the received GPS data over a wideband signal to a ground user at a remote location. Unfortunately, a wideband analog translator is typically easily detected by surrounding users, contains no additional telemetry capability, and by virtue of size and power requirements is limited to a single frequency. Special ground equipment is required in order to receive the repeated signal from the registration shell, and in general, the system cannot accommodate more than one registration shell in flight at a given time. The accuracy provided the user of such system is generally considered to warrant the increased risk by minimizing the number of attempts necessary to place an object in a given location, and the corresponding time period from beginning to end of the mission. However, improvements in the prior art system which would provide increased stealth capability, accommodate telemetry down-link and the providing of control signals to the shell would be advantageous. Additionally, the minimization of any gear required to support such operations would also be of great benefit.

Accordingly, a need exists for an improved method of navigating and monitoring the results of such navigation of unmanned apparatus such as high-velocity missiles or shell projectiles.

SUMMARY OF THE INVENTION

The present invention comprises a method and system for providing a data-link between an unmanned apparatus traveling through the earth's atmosphere and a remotely located ground station. The system is comprised of a first radio position determination receiver mounted within the unmanned flight item, capable of instantaneous position determination relative to the earth's surface, that is electrically coupled to a transmitter also included in the unmanned item that transmits the determined instantaneous position of the item during flight to a ground station having a receiver configured to receive and process the transmit signal. Preferably, the receivers are both GPS receivers and the transmitter sends a GPS pseudo-lite signal to the ground station receiver which is specially adapted to accommodate the required processing. Additional features of the system include the ability to include telemetry data in the data down link, as well as providing a unique identifier, such as a PRN pseudolite number, for the given object in flight.

It is an object of the present invention to provide a system for monitoring and controlling unmanned flight vehicles, whether self-propelled or projected that travel through the earth's atmosphere.

It is a feature of the present invention to utilize a GPS receiver capable of calculating the instantaneous pseudo ranges of an item during the course of it's flight within or on the item.

It is an advantage of the present invention to provide a system of positional determination for unmanned vehicles in the earth's atmosphere to remote ground stations.

It is yet another advantage of the present invention to provide a system for simultaneously monitoring a plurality of items traveling through the earth's atmosphere with respect to their position and trajectory.

DETAILED DESCRIPTION OF THE PREFERRED EMBODIMENTS

The following detailed description is intended to provide specific detail enabling one of ordinary skill in the art to understand and practice the principals of the present invention. Portions of the description are set forth in terms of block diagrams or other symbolic representations of operations or databits within a computer system. For purposes of convenience terms such as bits, elements, values, symbols, characters, and so forth have been utilized in a manner consistent with common usage so as not to obscure or diminish the principle elements of the present invention. It is understood that throughout the description utilization of such terms as calculating, displaying, transmitting, or computing refer to the common usage of such terms on computer systems, radio receivers or transmitters, or the like and that manipulation or transformation of data represented as physical quantities within a given system's componentry are well understood by those of ordinary skill in the art.

Figure 1:
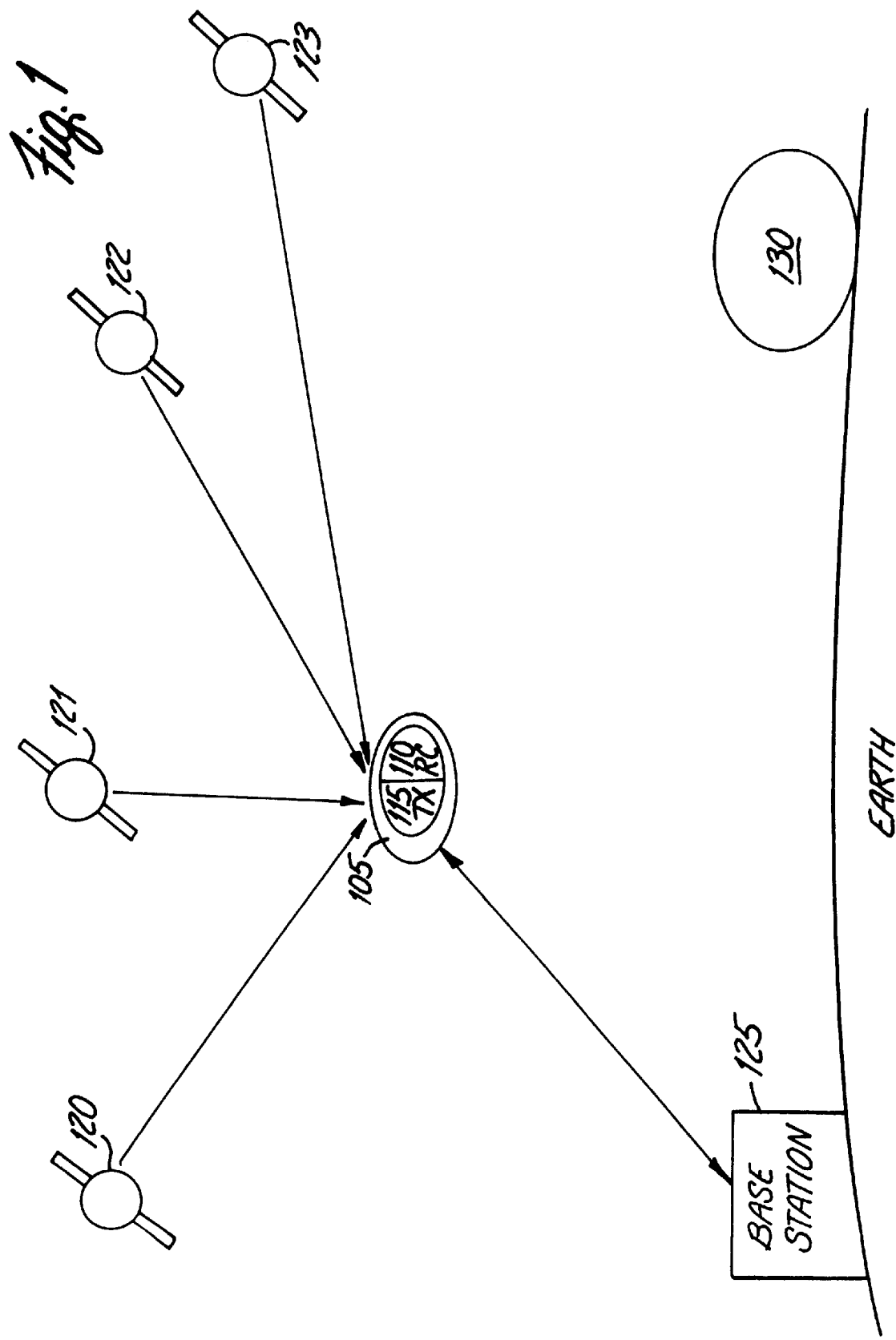
FIG. 1 illustrates a block diagram depiction of one embodiment of the teachings of a system incorporating the teachings of the present of invention.

Referring now to the drawings, wherein like items are referenced as such throughout, FIG. 1 illustrates an example guidance tracking and control system utilizing the teachings of the present invention. The system maybe generally thought of as an unmanned flight vehicle 105, having an onboard radio receiver 110 (such as a GPS receiver) capable of receiving satellite signals emanating from a plurality of spacecraft 120–123. The radio receiver 110 is then able to compute the instantaneous position of the vehicle 105 with respect to the earth's surface by processing the received signals from spacecraft 120–123. This information is then provided to an onboard transmitter 115. The transmitter formats the data along with any other flight information predetermined for down link via transmitter 115 to a base station 125. The base station 125 is comprised of a transceiver capable of receiving and processing signals emanating from transceiver 115 and in a similar fashion, uplinking signals to vehicle 105. The information included in the down-link to the base station is utilized at the base station to process a projected path of travel for item 105.

In operation, the vehicle 105 could be a projectile such as a shell launched from an artillery gun, a ground or airbased missile, or some other unmanned self-propelled vehicle. In most instances it is envisioned that item 105 would travel at a high rate of speed through the earth's atmosphere preferably landing or circling a destination 130 located fifty kilometers or more from the base station 125. The receiver 110 on item 105 is a NavStar GPS receiver that determines positional location by virtue of receiving signals from four spacecraft simultaneously (120–123) each having a uniquely identified telemetry down-link. Upon the calculation of the relative position of vehicle 105 such information is modulated on to a signal, via transceiver 115 and sent to base station 125 as a GPS pseudo-lite signal. The pseudo-lite signal is capable of reception by either a specially modified GPS receiver or a receiver configured to receive and process that signal. Further details of the onboard and ground station equipment are set forth in FIGS. 2 and 3.

Figure 2:
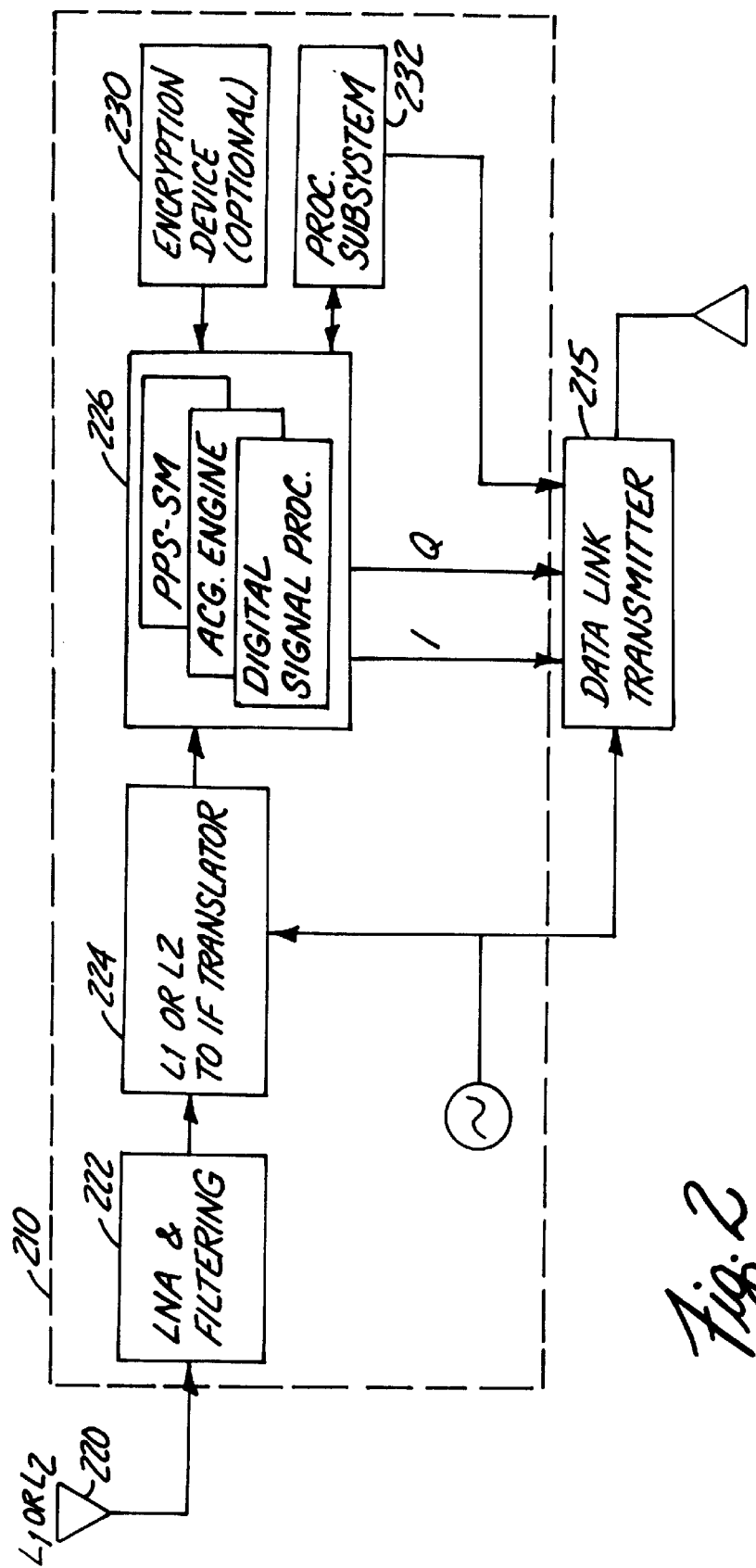
FIG. 2 illustrates the airborne, or flight vehicle communication package for one embodiment of the present invention; and, FIG. 3 illustrates a block diagram of one embodiment of a ground station of the present invention.

FIG. 2 illustrates a GPS receiver 210 and variable band data link transmitter 215 suitable for incorporation on a flight vehicle, such as item 105 of FIG. 1. The GPS receiver is provided with an antenna 220 coupled to traditional front end receiver processing, including low noise amplifying and filtering 222 and then converting either the L1 or L2 signal received from the down link spacecraft and translating the same to an intermediate frequency 224. The IF signal is then coupled to processing means 226 where additional telemetry data such as temperature or other physical measured components of the vehicle are combined with the GPS position determination and subsequently linked to transmitter 215. Transmitter 215 then broadcasts such modulated information to the base station for processing and analysis. Additional functions such as encryption or some other processing subsystem, may optionally be configured as separate components, 230 and 232 respectively.

As depicted, the GPS receiver 210 is capable of processing either L1 or L2 signals. In either case, the GPS measurements and telemetry information may be spread using a GPS P-code from a spare channel in the GPS receiver or a separate code generator. The data may then be modulated onto an inphase component I, of the pseudo-lite signal in BPSK format. Such a transmission scheme would support up to one Kbps per second. For those instances requiring more than one Kbps of information per second data could be modulated on to the quadrature phase, Q component of the pseudo signal by creating QPSK format, thereby allowing an additional one Kbps of data transmission. After modulation, the pseudo signal is translated to the desired transmission frequency, such as S-band and transmitted.

FIG. 3 illustrates in block diagram format a ground station 300, capable of use in the present invention. As shown, a direct GPS receiver 325 is coupled to a pseudolite GPS transceiver 332, and together are capable of receiving and processing the down link signal from the transmitter 215 of FIG. 2. The transceiver 332 includes an antenna 334, a translator 338, for converting the variable band signal to L1 or to IF, and subsequently creates a navigation solution which is routed to ground processing means 340, thereby providing accurate input to be utilized by an operator of item 105 (FIG. 1).

In an attempt to provide increased accuracy, a differential correction signal may be created in the ground base station, 327. This information can then be factored into the positional information acquired from the remote receiver thereby providing increased accuracy of positional determination with respect to a given data point.

It is understood that the receiver 325 may contain multiple channels which are adapted for receiving and processing standard GPS signals in either L1 or L2 band. Thus, the equipment necessary for a base station operator is the equivalent of a present day portable GPS receiver. In those instances where the ground user wishes to exert control or guidance over the item 105, a control signal may be generated via item 332. It should also be pointed out that when operating the above described system utilizing a GPS P-code pseudolite signal, the down link data can be identified for each apparatus in flight via one of thirty-seven available P-code identification screens. It is also worth noting that since the GPS signal emanates at a relative low power, at or below the noise level even at short range, determination of the location of the ground station is greatly reduced by the above described scheme. Furthermore, given the advantages of current day electronic fabrication and assembly techniques, the onboard GPS receiver and transmitter transceiver can be fabricated on printed circuit boards utilizing standard assembly techniques having relatively small footprints. Associated power necessary to operate such a signal is greatly reduced from prior art p(y) analog data translators which typically operate consuming 16–24 watts of power in contrast with the described invention which can be operated at less than 1.5 watts power. In addition, the ability to uniquely identify data stream from each flight apparatus by virtue of the P-code sequency identifier provides the inherent capability to monitor up to 37 transmitters simultaneously in flight as contrasted to the prior art analog translator which would require duplicative equipment for duplicative ground base station equipment for each flight vehicle being monitored at a given time. In addition the onboard processing of position determination available by the present invention allows for the inclusion of telemetry data heretofore unavailable unless a separate system was utilized to down link such telemetry data.

While particular embodiments of the present invention have been shown and described, it should be clear that changes and modifications may be made to such embodiments by one of ordinary skill in the art without departing from the spirit of the invention. It is intended that the appended claims cover all such changes and modifications.

We claim:

1. A system for providing position data from an unmanned item traveling through the earth's atmosphere, comprising:
   a first radio position determination receiver mounted within the unmanned flight item, that is independently capable of determining the instantaneous position of the item, relative to the earth's surface;
   a transmitter electrically coupled to the first radio position determination receiver and also included within the unmanned flight item, for transmitting the earth relative position of the item;
   a second radio position determination receiver, remotely located from the transmitter, that is capable of receiving and processing the transmitter output signal; and,
   a processor utilizing the information received by the second radio in conjunction with known mathematical models for arriving at the anticipated flight trajectory of the unmanned flight item.

2. The system of claim 1, wherein the first radio position determination receiver is a global position receiver.

3. The system of claim 2, wherein the transmitter creates a downlink signal containing relative position information of the unmanned item that is a pseudo-signal of the GPS system.

4. The system of claim 3, wherein the first GPS receiver utilizes coarse acquisition code of orbiting GPS spacecraft to arrive at the relative position of the unmanned item.

5. The system of claim 3, wherein the first GPS receiver utilizes precise code of orbiting GPS spacecraft to arrive at the relative position of the unmanned item and the second GPS receiver is capable of processing the GPS precise code.

6. The system of claim 5, range of the distance between the first and second GPS receivers is up to fifty kilometers.

7. The system of claim 1, wherein the flight time of the unmanned item is no greater than three minutes.

8. A system for providing position data from a plurality of ballistic launched shells traveling through the earth's atmosphere, comprising;
   a first radio position determining receiver mounted within the unmanned flight item, that is capable of determining the instantaneous position of the item, relative to the earth's surface by utilizing Global Positioning Satellite precision code;
   a transmitter electrically coupled to the receiver and also included within the unmanned flight item, for transmitting the relative position of the item as a GPS pseudo-signal that further utilizes one of the P-code strings as a unique identifier for the given shell and transmits such downlink signal in variable band;
   a ground station that includes:
      a GPS receiver capable of processing GPS P(y) code and pseudo-signals in variable band;
      a processor utilizing the information received by the ground station GPS receiver in conjunction with predetermined coding schemes for pseudo-signal uniqueness and known mathematical models for arriving at the anticipated flight trajectory of the unmanned item.

9. The system of claim 8, range of the distance between the first and second GPS receivers is up to fifty kilometers.

10. The system of claim 8, wherein the flight time of the unmanned item is no greater than three minutes.

11. The system of claim 8, wherein up to thirty-seven shells are capable of simultaneous tracking.

12. The system of claim 8, further including a ground station transmitter capable of transmitting telemetry to the shell GPS receiver as a pseudo-signal, thereby providing guidance and control information to the shell.

13. The system of claim 8, wherein the shell is capable of being fired from a 155 mm gun and the shell GPS receiver is contained within the fuse of the shell.

14. A system for providing position data from a plurality of ballistic launched shells traveling through the earth's atmosphere, comprising:
   a first radio position determination receiver mounted within the unmanned flight item, that is capable of determining the instantaneous position of the item, relative to the earth's surface by utilizing Global Positioning Satellite precision code, said receiver comprising an antenna, coupled to a translator for converting a GPS signal to an intermediate frequency, signal processing means coupled to the translator for receiving the analog intermediate signal, determining the relative position of the shell for a given data stream, combining and modulating such position information with predetermined shell telemetry data onto a component signal of the intermediate frequency;
   a transmitter electrically coupled to the receiver that transmits the intermediate frequency component signals in QPSK and BPSK format in variable band;
   a ground station that includes:
      a GPS receiver capable of processing GPS P-code and pseudo-signal in S-band;
      a processor utilizing the information received by the ground station GPS receiver in conjunction with predetermined coding schemes for pseudo-signal uniqueness and known mathematical models for arriving at the anticipated flight trajectory of the unmanned item.

15. The system of claim 14, range of the distance between the first and second GPS receivers is up to fifty kilometers.

16. The system of claim 14, wherein the flight time of the unmanned item is no greater than 3 minutes.

17. The system of claim 14, wherein up to thirty-seven shells are capable of simultaneous tracking.

18. The system of claim 14, further including a ground station transmitter capable of transmitting telemetry to the shell GPS receiver as a pseudo-signal, thereby providing guidance and control information to the shell.

19. The system of claim 14, wherein the shell is capable of being fired from a 155 mm gun and the shell GPS receiver is contained within the fuse of the shell.

20. The system of claim 14, wherein the telemetry data and GPS position data are included in the in-phase and quadrature phase components of the intermediate frequency signal provided to the transmitter.

\* \* \* \* \*